US006416835B1

(12) United States Patent
Preston et al.

(10) Patent No.: US 6,416,835 B1
(45) Date of Patent: Jul. 9, 2002

(54) COMBINATION STATIC CLING AND PRODUCT LABEL ASSEMBLY

(75) Inventors: Robin R. Preston, Comstock Park; John L. Jonkman, Lowell, both of MI (US)

(73) Assignee: Grand Rapids Label Company, Grand Rapids, MI (US)

( * ) Notice: Subject to any disclaimer, the term of this patent is extended or adjusted under 35 U.S.C. 154(b) by 0 days.

(21) Appl. No.: 09/536,670

(22) Filed: Mar. 27, 2000

Related U.S. Application Data

(60) Provisional application No. 60/131,931, filed on Apr. 30, 1999.

(51) Int. Cl.$^{7}$ .......................... B32B 3/06; B32B 31/04; B42D 15/00; C09J 7/02; G09F 3/20; G09F 19/00

(52) U.S. Cl. .................... 428/40.1; 428/41.7; 428/41.8; 428/42.1; 428/343; 283/81

(58) Field of Search .............................. 428/40.1, 42.1, 428/41.7, 343, 41.8; 40/594; 283/81

(56) References Cited

U.S. PATENT DOCUMENTS

| | | | | |
|---|---|---|---|---|
| 4,400,419 A | | 8/1983 | Laczynski | 428/40 |
| 4,652,239 A | | 3/1987 | Brimberg | 434/80 |
| 5,102,171 A | | 4/1992 | Saetre | 283/117 |
| 5,174,605 A | | 12/1992 | Instance | 281/5 |
| 5,334,431 A | | 8/1994 | Longtin | 428/40 |
| 5,403,025 A | * | 4/1995 | Shanley | 283/81 |
| 5,620,764 A | * | 4/1997 | Schwartz et al. | 428/39 |
| 5,643,388 A | | 7/1997 | Peterson | 156/272.6 |
| 5,888,615 A | | 3/1999 | Mascarenhas et al. | 428/141 |

* cited by examiner

*Primary Examiner*—Shrive P. Beck
*Assistant Examiner*—Elena Tsoy
(74) *Attorney, Agent, or Firm*—McGarry Bair LLP

(57) ABSTRACT

A label assembly comprising a paper stock or similar label material having an upper surface containing printed indicia and having a varnish coating, the varnish coating being a raw polymer varnish without any slip agent or anti-blocking agent, and a static cling label containing complementary printed indicia mounted to the varnished upper surface of the label material. The label material has a pressure-sensitive adhesive on a lower surface for releasable mounting and initial assembly to a backing web having a release coating, typically provided in roll form. The label assembly can be peeled from the backing layer and applied to a support surface, then the static cling label can be peeled from the varnished surface of the label and applied to another surface such as the inside surface of a windshield. A method of making the label assembly comprises providing a label stock material having a printed upper surface and a lower surface adhesively secured to a backing web having a release coating; laminating a web of static cling material is to the upper surface of the label stock material, printing on the upper surface of the static cling web material; and die cutting the label stock/static cling web material into discrete label assemblies.

16 Claims, 4 Drawing Sheets

COMBINATION STATIC CLING AND PRODUCT LABEL ASSEMBLY

CROSS-REFERENCE TO RELATED APPLICATIONS

This application claims the benefit of U.S. Provisional Application No. 60/131,931 filed Apr. 30, 1999.

BACKGROUND OF THE INVENTION

1. Field of the Invention

This invention relates to label assemblies and methods of making the same. In one of its aspects, the invention relates to a label assembly that has both a product label and a separable static cling reminder label. In another of its aspects, the invention relates to a method of making a label assembly. In still another of its aspects, the invention relates to a method for servicing an automobile with a windshield in which the oil is changed and a static cling layer is applied to a windshield with date/mileage sensitive information recorded.

2. State of the Prior Art

Static cling labels are used as reminders to a vehicle owner for oil change purposes. The static cling labels cling to the inside surface of an automobile windshield and have written information as to when the next oil change is due in terms of mileage and/or date. These static cling labels are applied at the time of an oil change.

Similar types of information are placed on the inside of a door of the vehicle or, alternatively, on an oil filter canister. The oil filter canister will have a product label indicating the type of filter that is installed in the filter canister. These labels typically have a slip agent or anti-blocking agent incorporated in an external varnish which covers the printed label to prevent marring of the label prior to installation of the label on the product. These slip agents and anti-blocking agents make the surface fairly slippery and avoid surface abrasions due to inadvertent rubbing of the surface with hard parts. These varnishes provide a slippery surface for laminates as well and typically do not hold laminates that do not have adhesives on them.

The U.S. Patent to Longtin, issued Aug. 2, 1994, discloses an assembly of a web substrate and a plurality of release liners having static cling labels thereon for dispensing the static cling labels. The release liner is described as a polycoated bleached liner or a white tag liner. The release liner is said to be discarded after the static cling layer has been applied to an intended surface. The polycoated bleached liner and white tag liner are usually coated with a slip agent or anti-blocking agent to form a slippery surface which does not hold the static cling layer well.

SUMMARY OF THE INVENTION

According to the invention, a label assembly comprises a paper stock or similar label material having an upper surface printed with at least one of product and service information and a varnish coating the printed upper surface. The varnish coating is preferably a raw polymer varnish without any slip agent or anti-blocking agent. A static cling label with data entry indicia is mounted to the varnished upper surface of the product label. The product label has an adhesive on a lower surface and is typically mounted to a backing web with a release agent, which typically is provided in roll form.

In use, the label assembly is peeled from the backing layer and applied to a support surface such as a canister or a doorframe. The static cling label is peeled from the varnished surface of the label and applied to another surface, for example, the inside surface of a windshield. Typically, data is written on the static cling label before peeling the static cling label from the product label.

In a preferred embodiment of the invention, the product label has indicia indicative of an oil filter and the static cling label has indicia for entry of mileage and date of filter change information.

Further, according to the invention, a method of making a label assembly comprises providing a label stock material having a printable upper surface and a lower surface adhesively secured to a backing layer with a release coating. The label stock material is printed with product or service information on an upper surface. Preferably, the upper surface of the label stock material is coated with a raw varnish without any slip agent or anti-blocking agent. A web of static cling material is laminated to the printed upper surface of the label stock material and an upper surface of the static cling web is printed. The static cling and paper stock webs are die cut to form labels and the excess label stock and static cling label are removed from the backing layer. The backing layer with the adhesive laminate is rolled into a roll of stock material.

Still further according to the invention, a method for servicing an automobile with a windshield, in which the oil is changed and a static cling layer is applied to a windshield with date/mileage sensitive information recorded, comprises the steps of providing a label assembly including a product label having on one side a pressure sensitive adhesive and on another side product or service indicia printed thereon. A static cling layer is releasably mounted on the other side of the product label over the idicia. The static cling layer has printed recording indicia on one side thereof. The label assembly is applied to one portion of the vehicle visible to a service person, for example a filter canister or a door frame. Information, for example, mileage and date, is applied to the static cling layer. The static cling layer is then applied to the windshield of the automobile.

In one embodiment of the above method, the product label has indicia indicative of an oil filter and the static cling label has indicia for entry of mileage and date of filter change information. In a preferred embodiment of the above method, the other side of the product label has a raw varnish finish to enhance adhesion of the static cling label to the other side of the product label. The raw varnish coating has essentially no slip agent or anti-blocking agents incorporated therein.

BRIEF DESCRIPTION OF THE DRAWINGS

The invention will now be described with reference to the accompanying drawings in which.

DESCRIPTION OF THE PREFERRED EMBODIMENTS

Figure 1:
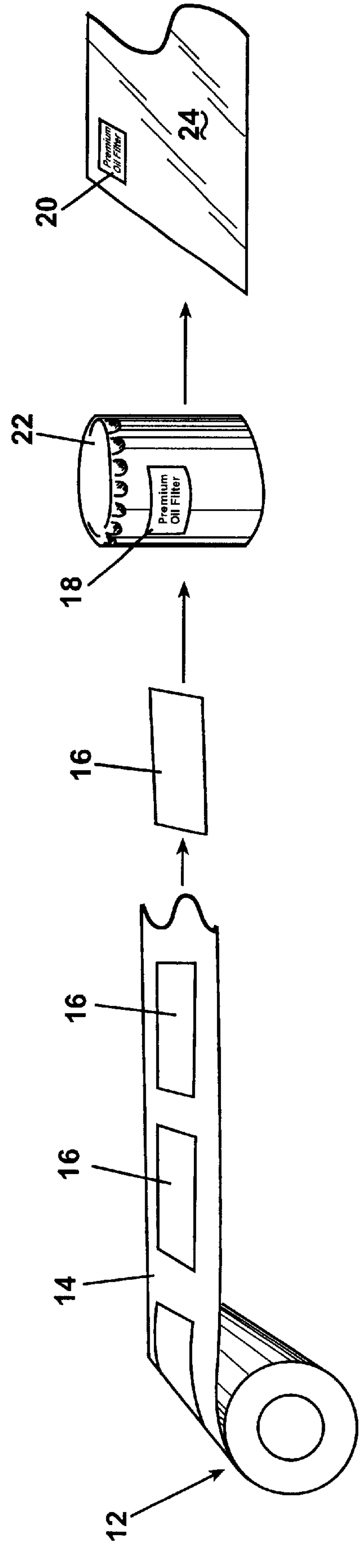
FIG. 1 is a perspective schematic view of a label assembly according to the invention and the manner in which the label assembly is used.

Referring now to the drawings and to FIG. 1 in particular, a roll of labels 12 comprises a backing web 14 and a label assembly 16 according to the invention. The label assembly 16 is releasably mounted to the backing layer 14 through a pressure-sensitive adhesive. The label assembly 16 can be peeled from the backing layer 14 in a conventional manner and applied to a support surface, for example, a filter canister. The label assemblies 16 comprise a product label 18 with printing on an upper surface thereof and a printed static cling label 20. Indicia is typically written onto the printed static cling label by a worker at the time the label assembly 16 is peeled from the backing web 14 and applied to the filter canister 22. The static cling label 20 is then removed from the printed product label 18 and applied to a more visible surface, for example, the inside surface of a windshield 24.

Figure 2:
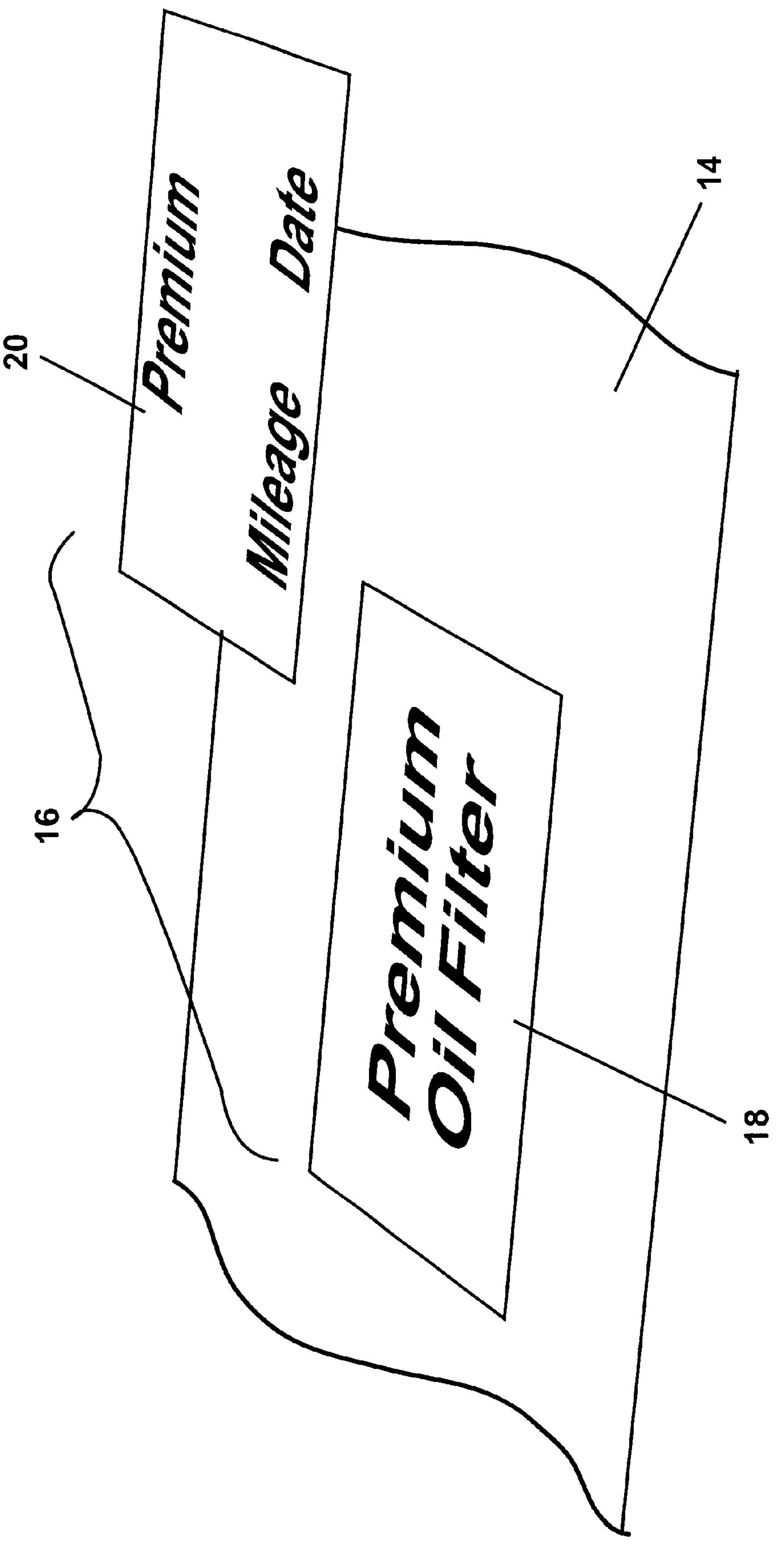
FIG. 2 is a perspective exploded view of a label assembly according to the invention.

With reference to FIG. 2, the label assembly comprises a backing sheet 14, a printed product label 18 and a printed static cling label 20 which are assembled as a unit. The product label 18 is mounted to the backing layer through a conventional pressure-sensitive adhesive. The backing layer 14 is a conventional release layer having a release coating. The static cling label 20 is of conventional construction and has printing thereon.

Figure 3:
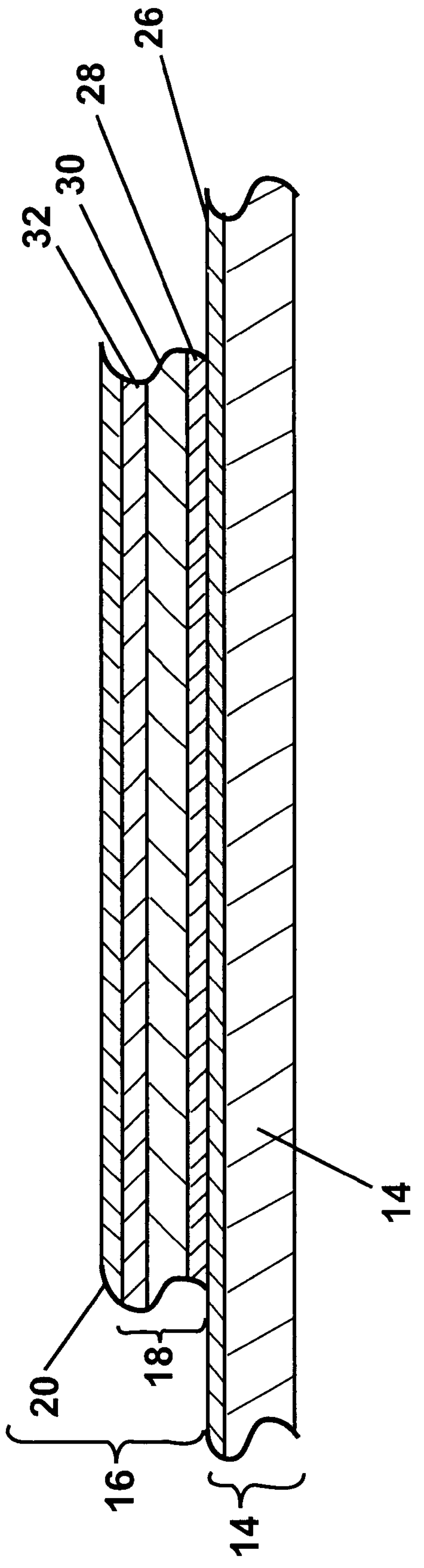
FIG. 3 is a cross-sectional view through a label assembly according to the invention as mounted on a backing layer with a release coating.

The structure of the label assembly 16 is illustrated in cross section in FIG. 3 to which reference is now made. The backing layer 14 has a release coating 26 on an upper surface. A base stock material 30 has a pressure-sensitive adhesive 28 on an underside thereof. The base stock material 30 can be paper or plastic film. The adhesive releasably mounts the stock material 30 to the backing web 14. The stock material 30 has printing (not shown in FIG. 3) on an upper surface thereof and has a varnish coating 32 over the printing label. The varnish coating is desirably a raw polymer varnish without slip agent or anti-blocking agents such as polyethylene and waxes. Examples of such varnishes are XCELL WVF 010910 manufactured by Water Ink Technology of North Carolina or a UV varnish from North West Coatings Corporation, designated as NORTH WEST 12517. Another example of such coating in K-2072 from SUN Chemical of Kalamazoo, Mich.

The stock material 30, the adhesive 28 and the varnish coating 32 form the product label 18. A static cling label 20 is mounted on the varnish coating 32 and is adhered thereto simply by static cling forces. The static cling label 20 and the product label 18 form the label assembly 16.

Static cling labels are well known and comprise soft vinyls which cling to surfaces like Saran Wrap®. An example of a static cling label web is made by Flexcon of Spencer, Mass. Other examples of a static cling label webs include static cling polyolefins and face stocks (paper or plastic film) with ultra low peel adhesives. Another static cling material which can be used in the invention is statically charged polypropylene film under the trade Cling Z manufactured by Permacharge and distributed by Transilwrap.

Figure 4:
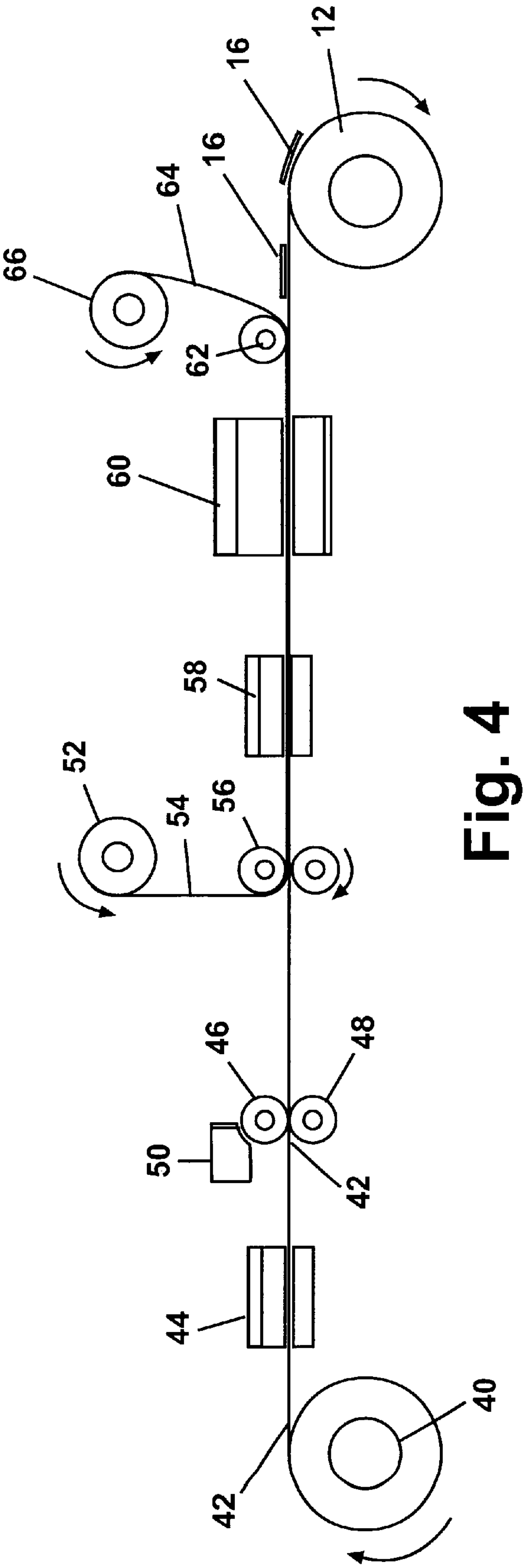
FIG. 4 is a schematic view of a process for making the label assembly according to the invention.

A process for making the label assembly according to the invention is illustrated in FIG. 4 to which reference is now made. A roll 40 of label stock material 42 comprises a laminate of a conventional label web 28, 30 which is adhesively laminated to a backing web 14 having a release coating 26 thereon. The upper surface of the label stock material 42 is passed through a printer 44 wherein printed material is coated onto the upper surface of the label stock material 42. The label stock material 42 is then passed through a varnish applicator comprising an idler roll 48, a varnish application roller 46 which applies varnish from a varnish vat 50 in a well-known manner. The varnish applied is the raw polymer varnish without a slip agent or an anti-blocking agent. If desirable, minor amounts of slip agent or an anti-blocking agent can been added to the raw polymer varnish. The varnish layer is dried, for example, in a conventional dryer or by air drying, and a static cling web 54 which is fed from a roll of static cling material 52 is laminated to the varnish layer on the label stock material 42 with the aid of idle rollers 56. The laminated static cling material and paper stock is then passed through a printer 58 wherein a print coating is added to the upper surface of the static cling web. The laminated and printed assembly is then passed through a die cutter 60 wherein labels are die cut in a conventional fashion. A salvage web 64 is peeled from the labels on the backing web 14 at an idle roller 62 and is collected in a roll 66. The remaining laminate comprises the backing web 14 and label assemblies 16 which are then collected in a roll of labels 12.

Whereas the invention has been described with reference to a combination reminder static cling label and product label for use in oil filters and with oil changes, the label assemblies can be used for many different purposes. The labels can be used for any purpose in which a product label is applied to a container and a reminder label is placed on another surface which can remind a consumer of some event in the future. Thus, the invention is not limited to the specific application of an oil filter and oil change reminder.

Reasonable variation and modification are possible within the scope of the foregoing disclosure and drawings without departing from the spirit of the invention.

What is claimed is:

1. A combination backing web and label assembly comprising a backing web of indefinite length, the web having a release coating on one surface thereof; a plurality of label assemblies releasably mounted to the one surface of the backing web through a pressure sensitive adhesive, the label assemblies comprising a product label having on one side the pressure sensitive adhesive and on an other side thereof product or service indicia printed thereon; a static cling label releasably mounted on the other side of the product label, the static cling label having data entry indicia on one side thereof, whereby the label assemblies can be peeled from the backing web and applied to the surface of a product container and the static cling labels can be peeled from the product labels and applied to another surface.

2. A combination backing web and label assembly according to claim 1 wherein the product label has indicia indicative of an oil filter and the static cling label has indicia for entry of mileage and date of filter change information.

3. A combination backing web and label assembly according to claim 1 wherein the other side of the product label has a raw varnish finish to enhance adhesion of the static cling label to the other side of the product label.

4. A combination backing web and label assembly according to claim 3 wherein the product label has indicia indicative of an oil filter and the static cling label has indicia for entry of mileage and date of filter change information.

5. A combination backing web and label assembly according to claim 4 wherein the raw varnish coating has essentially no slip agent or anti-blocking agents incorporated therein.

6. A combination backing web and label assembly according to claim 3 wherein the raw varnish coating has essentially no slip agent or anti-blocking agents incorporated therein.

7. A combination backing web and label assembly comprising:

a backing web of indefinite length, the web having a release coating on one surface thereof;

a plurality of label assemblies releasably mounted to the one surface of the backing web through a pressure sensitive adhesive, the label assemblies comprising:

a product label having on one side a pressure sensitive adhesive and on an other side a raw varnish finish, and a static cling label releasably mounted onto the raw varnish finish on the other side of the product label, the raw varnish finish providing enhanced adhesion of the static cling label to the other side of the product label, the static cling label having data entry indicia on one side thereof, whereby the label assemblies can be peeled from the backing web and applied to the surface of a product container and the static cling label can be peeled from the product label and applied to another surface.

8. A combination backing web and label assembly according to claim 7 wherein the product label has indicia indicative of an oil filter and the static cling label has indicia for entry of mileage and date of filter change data.

9. A combination backing web and label assembly according to claim 8 wherein the raw varnish coating has essentially no slip agent or anti-blocking agents incorporated therein.

10. A combination backing web and label assembly according to claim 7 wherein the raw varnish coating has essentially no slip agent or anti-blocking agents incorporated therein.

11. A two part label assembly for application to an article, wherein a first part of the assembly has pre-printed information and a static cling part of the assembly has user-specific data entry indicia, the first part is adapted to be applied to a first portion of the article, the static cling part is adapted to be applied to a second portion of the article, the assembly is adapted to be applied first to the first portion of the article, then the static cling part can be removed from the first part to be applied to the second portion with the user-specific data entered on the static cling part.

12. A combination backing web and label assembly according to claim 11 wherein the first part has indicia indicative of an oil filter and the static cling part has indicia for entry of mileage and date of filter change information.

13. A combination backing web and label assembly according to claim 11 wherein the first part has a raw varnish finish to enhance adhesion of the static cling part to the first part.

14. A combination backing web and label assembly according to claim 13 wherein the first part has indicia indicative of an oil filter and the static cling part has indicia for entry of mileage and date of filter change information.

15. A combination backing web and label assembly according to claim 14 wherein the raw varnish coating has essentially no slip agent or anti-blocking agents incorporated therein.

16. A combination backing web and label assembly according to claim 13 wherein the raw varnish coating has essentially no slip agent or anti-blocking agents incorporated therein.

* * * * *